United States Patent
Kuwahara et al.

(10) Patent No.: US 11,152,828 B2
(45) Date of Patent: Oct. 19, 2021

(54) ROTATING ELECTRIC MACHINE

(71) Applicant: Mitsubishi Electric Corporation, Tokyo (JP)

(72) Inventors: Yoshiki Kuwahara, Tokyo (JP); Ryuji Kitamura, Tokyo (JP); Yoshiaki Kitta, Tokyo (JP); Fumitaka Totsuka, Tokyo (JP); Koichi Ojima, Tokyo (JP); Masaya Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/336,138

(22) PCT Filed: Nov. 16, 2016

(86) PCT No.: PCT/JP2016/083947
§ 371 (c)(1),
(2) Date: Mar. 25, 2019

(87) PCT Pub. No.: WO2018/092209
PCT Pub. Date: May 24, 2018

(65) Prior Publication Data
US 2019/0260255 A1 Aug. 22, 2019

(51) Int. Cl.
*H02K 3/32* (2006.01)
*H02K 1/14* (2006.01)
(Continued)

(52) U.S. Cl.
CPC ............ *H02K 3/325* (2013.01); *H02K 1/146* (2013.01); *H02K 3/46* (2013.01); *H02K 3/52* (2013.01);
(Continued)

(58) Field of Classification Search
None
See application file for complete search history.

(56) References Cited

U.S. PATENT DOCUMENTS 7,382,075 B2 * 6/2008 Wang ............... H02K 3/522
310/179
8,922,079 B2 * 12/2014 Egami ............... H02K 3/522
310/71
(Continued)

FOREIGN PATENT DOCUMENTS

CN 101047327 A 10/2007
CN 102916504 A 2/2013
(Continued)

OTHER PUBLICATIONS

Communication dated Oct. 8, 2019, from the Japanese Patent Office in counterpart Application No. 2018-550914.
(Continued)

*Primary Examiner* — Quyen P Leung
*Assistant Examiner* — Minki Chang
(74) *Attorney, Agent, or Firm* — Sughrue Mion, PLLC; Richard C. Turner

(57) ABSTRACT

A rotating electric machine includes a rotor, a stator, and a case, wherein each of the sub stator cores has a first insulated bobbin, a stator iron core, a second insulated bobbin, and a coil, and the coil is disposed in teeth parts of the first insulated bobbin, the stator iron core, and the second insulated bobbin, all of which are stacked in layers, and the first insulated bobbin has three ring holding parts which are formed in a core back part and extend to a circumferential direction, and the bus rings are separately inserted into the ring holding parts formed in the first insulated bobbin, and the first insulated bobbin, the stator iron core, and the second insulated bobbin each has a convex part formed at one side face of the core back part and a concave part formed at the other side face of the core back part.

10 Claims, 20 Drawing Sheets

(51) Int. Cl.
*H02K 3/52* (2006.01)
*H02K 3/46* (2006.01)

(52) U.S. Cl.
CPC ......... *H02K 3/522* (2013.01); *H02K 2203/09* (2013.01); *H02K 2203/12* (2013.01)

(56) References Cited

U.S. PATENT DOCUMENTS

| | | | | |
|---|---|---|---|---|
| 2007/0080592 A1* | 4/2007 | Ohta | ...................... | H02K 3/522 310/71 |
| 2007/0232094 A1 | 10/2007 | Hoshika | | |
| 2009/0026873 A1* | 1/2009 | Matsuo | .................. | H02K 1/148 310/216.009 |
| 2009/0256439 A1* | 10/2009 | Inoue | ..................... | H02K 3/522 310/71 |
| 2011/0316365 A1* | 12/2011 | Kim | ....................... | H02K 5/225 310/43 |
| 2013/0113313 A1* | 5/2013 | Ikura | ...................... | H02K 3/522 310/71 |
| 2015/0061431 A1* | 3/2015 | Egami | .................... | H02K 3/522 310/71 |
| 2018/0076673 A1* | 3/2018 | Kazama | .................... | H02K 3/52 |
| 2018/0287449 A1* | 10/2018 | Iga | ......................... | H02K 3/522 |

FOREIGN PATENT DOCUMENTS

| | | |
|---|---|---|
| JP | 2004-157056 A | 6/2004 |
| JP | 2007-068313 A | 3/2007 |
| JP | 2007-267569 A | 10/2007 |
| JP | 2008-312277 A | 12/2008 |

OTHER PUBLICATIONS

Office Action dated Jul. 2, 2020 in Chinese Application No. 201680090718.1.

* cited by examiner

Front Side

Rear Side

ROTATING ELECTRIC MACHINE

CROSS REFERENCE TO RELATED APPLICATIONS

This application is a National Stage of International Application No. PCT/JP2016/083947, filed Nov. 16, 2016.

FIELD OF THE INVENTION

The present application relates to a rotating electric machine, and more particularly, relates to a rotating electric machine which can be applied to an electric generator, an electric motor, and what is more, to an electric motor generator and the like.

BACKGROUND OF THE INVENTION

There is devised a rotating electric machine, which includes a plurality of segment cores to form a stator, bobbins of resin made, each of which is attached to their own segment core and has a coil winding wire part, and coils of U phase, V phase, and W phase, each of which is wound around their own coil winding wire part (for example, refer to Patent Document 1). The coils of U phase, V phase, and W phase are each connected to one of three bus rings; a bus rings A, a bus ring B, a bus ring C. In addition, each of the coil common sides of the coils is connected to a neutral bus ring D to offer a star connection to those coils.

Furthermore, a rotating electric machine is devised, which includes a plurality of cores, which are to form a stator and separated each other, bobbins of resin made, each of which is provided in their own core and has a coil winding wire part, and coils of U phase, V phase, and W phase, each of which is wound around their own coil winding wire part (for example, refer to Patent Document 2). The coils of U phase, V phase, and W phase are each designed to be connected to one of three bus rings; a bus rings A, a bus ring B, a bus ring C. Each of the coil common sides of the coils is connected to a neutral bus ring D to offer the star connection to those coils. The bus rings are each designed to have a plate like shape. Each of the plate like bus rings is inserted into and held in their own groove like ring holding part, where each of the bobbins is provided with ring holding parts. Each of the bus rings has a coil connection part protruding to an axial direction, which is a portion of the cylinder part thereof and follows a circumferential direction. Each coil is connected to a coil connection part in each of the bus rings. All the cores, as well as all the bobbins, are arranged in a circular pattern and inserted into the inner periphery of a yoke.

CITATION LIST

Patent Literature

Patent Document 1: JP 2004-157056, A
Patent Document 2: JP 2007-68313, A

SUMMARY OF THE INVENTION

Technical Problem

In the rotating electric machine according to Patent Document 1, each of the bus rings is designed to have short cylinder like shape as a whole. Ring holding grooves are provided on a resin made bus ring holder, and are formed concentrically with each other. Each of the bus rings has a short cylinder part which is fitted into and holds a ring holding groove of circular ring shape. This bus ring holder is embedded in the front face of a bobbin. In addition, each of the bus rings is provided with a bent part, which is bent perpendicularly to an outside direction, from a portion following a circumferential direction of the short cylinder part. Each of the coils will be connected to their own bent part. Therefore, in the rotating electric machine, a bus ring holder, which is a different body from the bobbin, is used. A large number of assembling parts are contained in the stator and the embedment process of the bus ring holder is also required as an over plus. The stator employs a bus ring holder which is embedded in the front face of a bobbin, and then, the stator is increased in size due to the parts for embedment. Further, each of the bus rings is formed in cylindrical shape, and moreover, is provided with a bent part, and then, the bus ring is complicated in shape.

In the rotating electric machine according to Patent Document 2, the separated cores are arranged in a circular pattern. When assembling process is performed to arrange the cores, a clearance gap is required to be provided between two adjoining insulated bobbins, in order to induce mutual contact of the separated cores. In this case, when bus rings are held in the insulated bobbins, a part will be produced, in which the insulated bobbin does not intervene between a bus ring and a bus ring. The insulation between a bus ring and a bus ring is not secured. If a larger clearance gap is employed in order to secure the insulation between a bus ring and a bus ring, the size of a rotating electric machine will become larger in a diameter direction.

The present disclosure is made in order to solve the above mentioned subject matters in the rotating electric machine. In other words, the present disclosure aims at securing the insulation between a bus ring and a bus ring in a rotating electric machine, without increasing the number of assembling parts, where the rotating electric machine has three phase coils, each of which is connected to one of the bus rings.

Solution to Problem

A rotating electric machine according to the present application includes a rotor which has a rotating shaft, a stator which is arranged at an outer periphery side of the rotor, and a case which contains the rotor and the stator, wherein the stator has a plurality of sub stator cores arranged in a circular ring, a yoke disposed in the outer periphery side of the plurality of sub stator cores arranged in a circular ring, and three bus rings attached to the plurality of sub stator cores arranged in a circular ring, and each of the sub stator cores has a first insulated bobbin, a stator iron core, a second insulated bobbin, and a coil, and the coil is disposed in teeth parts of the first insulated bobbin, the stator iron core, and the second insulated bobbin, all of which are stacked in layers, and the first insulated bobbin has three ring holding parts which are formed in a core back part and extend to a circumferential direction, and the bus rings are separately inserted into the ring holding parts formed in the first insulated bobbin, and the first insulated bobbin, the stator iron core, and the second insulated bobbin each has a convex part formed at one side face of the core back part and a concave part formed at the other side face of the core back part.

Advantageous Effects of Invention

A rotating electric machine according to the present application includes a rotor which has a rotating shaft, a stator which is arranged at an outer periphery side of the rotor, and a case which contains the rotor and the stator, wherein the stator has a plurality of sub stator cores arranged in a circular ring, a yoke disposed in the outer periphery side of the plurality of sub stator cores arranged in a circular ring, and three bus rings attached to the plurality of sub stator cores arranged in a circular ring, and each of the sub stator cores has a first insulated bobbin, a stator iron core, a second insulated bobbin, and a coil, and the coil is disposed in teeth parts of the first insulated bobbin, the stator iron core, and the second insulated bobbin, all of which are stacked in layers, and the first insulated bobbin has three ring holding parts which are formed in a core back part and extend to a circumferential direction, and the bus rings are separately inserted into the ring holding parts formed in the first insulated bobbin, and the first insulated bobbin, the stator iron core, and the second insulated bobbin each has a convex part formed at one side face of the core back part and a concave part formed at the other side face of the core back part. Accordingly, the installation of a bus ring holder, which is a different body from the bobbin, is unnecessary, and what is more, the insulation can be secured.

DETAILED DESCRIPTION OF THE INVENTION

Figure 1:
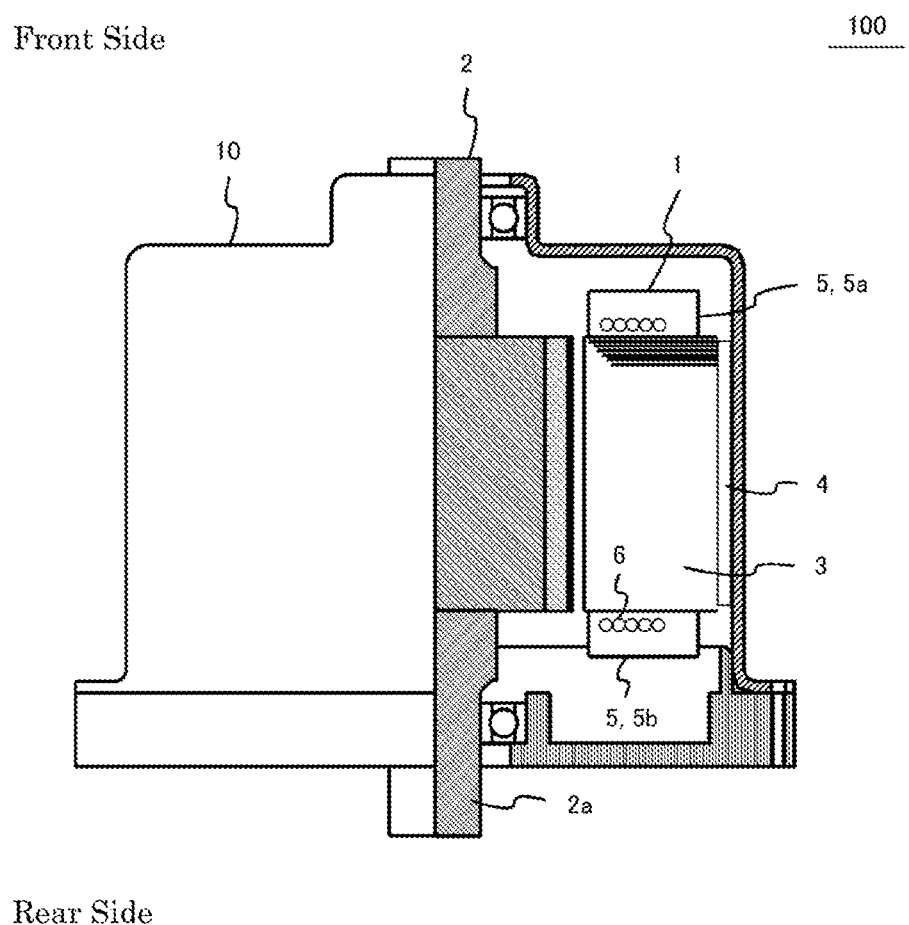
FIG. 1 is a cross sectional view for showing a rotating electric machine according to Embodiment 1 of the present application.

Hereinafter, a rotating electric machine according to the embodiments of the present disclosure will be described with reference to drawings. Incidentally, the same reference numerals are given to those identical or similar to constitutional portions in respective drawings and the size and/or the scale size of the corresponding respective constitutional portions are respectively independent. For example, when the identical constitutional portions, which are not changed, are shown, the size and/or the scale size of the identical constitutional portions may be different among sectional views in which a part of the configuration is changed. Furthermore, although the configurations of the rotating electric machine are further actually provided with a plurality of members, for ease of explanation, only portions necessary for explanation will be described and other portions are omitted.

Embodiment 1

Hereafter, explanation will be made about a rotating electric machine 1 according to Embodiment 1 of the present application, with reference to drawings. First, the outline of a rotating electric machine 100 which uses a stator 1 will be explained. FIG. 1 is a half sectional view which shows an internal structure of the rotating electric machine 100 according to the embodiments of the present application. The rotating electric machine 100 is provided with a stator 1, a rotor 2, and a case 10. The rotor 2 has a rotating shaft 2a. The stator 1 is composed of stator iron cores 3, a yoke 4, insulated bobbins 5, coils 6, and the like. The rotor 2 and the stator 1 are contained in the case 10. The stator 1 (and the stator iron cores 3) is arranged at the outer periphery side of the rotor 2. The yoke 4 is disposed in the outer periphery side of stator iron cores 3. The stator iron core 3 is attached with a matched pair of a front side insulated bobbin 5a (a first insulated bobbin, or a second insulated bobbin) and a rear side insulated bobbin 5b (a second insulated bobbin, or a first insulated bobbin).

Figure 2:
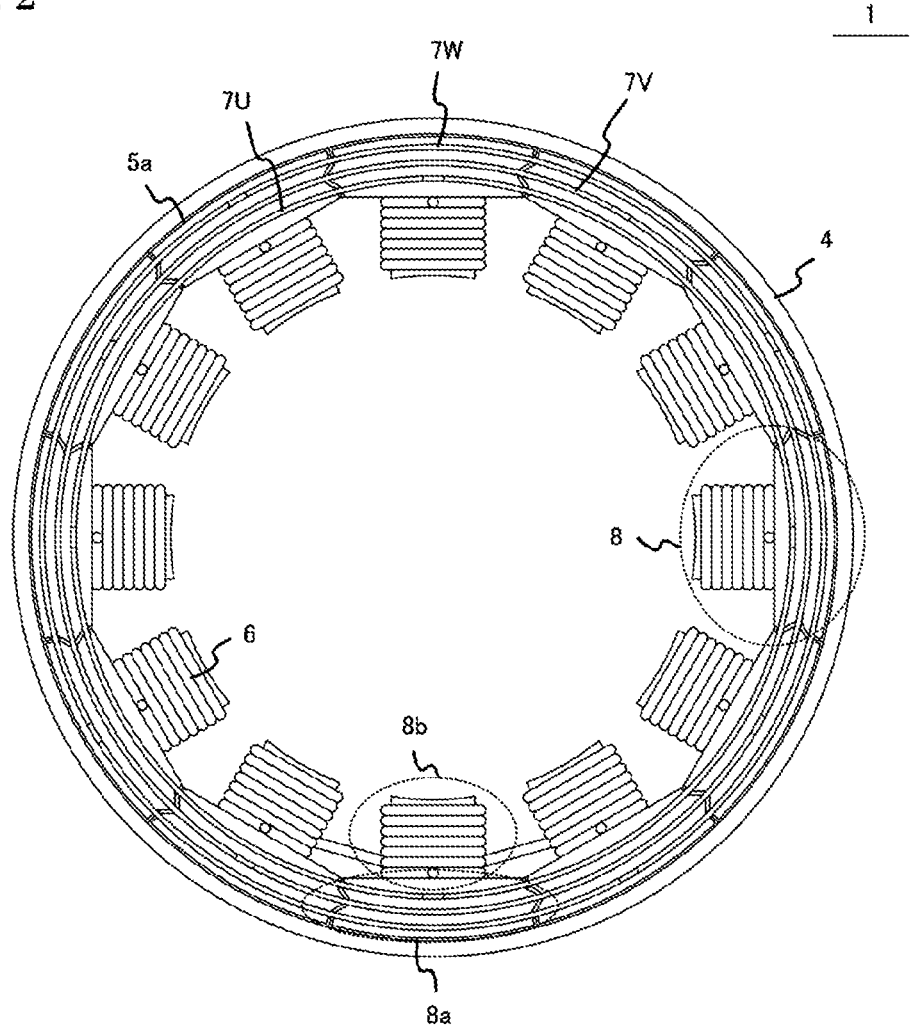
FIG. 2 is a top view for showing a stator according to Embodiment 1 of the present application.

Either of the two insulated bobbins 5 is attached with bus rings (refer to FIG. 2). Resin is suitably adopted to the insulated bobbins 5 (a front side insulated bobbin 5a and a rear side insulated bobbin 5b). A coil 6 is wound around a stator iron core 3 and two insulated bobbins 5, all of which are stacked in layers, in order to generate a rotating field. The coil 6, which is wound around the stator iron core 3, will be connected to an inverter which is located outside. Rotating fields will be generated in the stator 1, when alternating electric current of three phases (U phase, V phase, and W phase), for example, is supplied to the coil 6. The rotor 2 rotates according to the suction force or the repulsion force, which results from the rotating field. The rotating electric machine 100 is a machine which can be applied to all kinds of electric motors, such as a motor which is provided in a home electrical machine, or a motor which drives a general industrial machine, and the like.

FIG. 2 shows a front view of the stator 1. In the rotating electric machine 100 according to the present embodiment, a core segmentation structure is adopted in the stator iron core 3. The stator 1 is provided with twelve of sub stator cores 8, which are inter linked together. The sub stator cores 8 are arranged in a circular ring, and a yoke 4 is inserted in the outer diameter side of the sub stator cores. Three bus rings are attached to a plurality of sub stator cores which are arranged in a circular ring. Each of the sub stator cores 8 is composed of a core back part 8a and a teeth part 8b. A bus ring 7U, a bus ring 7V, and a bus ring 7W are attached to front side insulated bobbins 5a. Ring holding parts are formed in the front side insulated bobbin 5a, in order to attach bus rings 7U, 7V, and 7W to the core back part (a circular ring part) of the front side insulated bobbin 5a. Each of the bus rings 7U, 7V, and 7W is of plate like shape and also of ring like shape, and is disposed in more inner periphery side than the yoke 4. In the drawing, the end point of a coil stands straight so that a winding wire of the coil 6 may not interfere with another winding wire.

Figure 3:
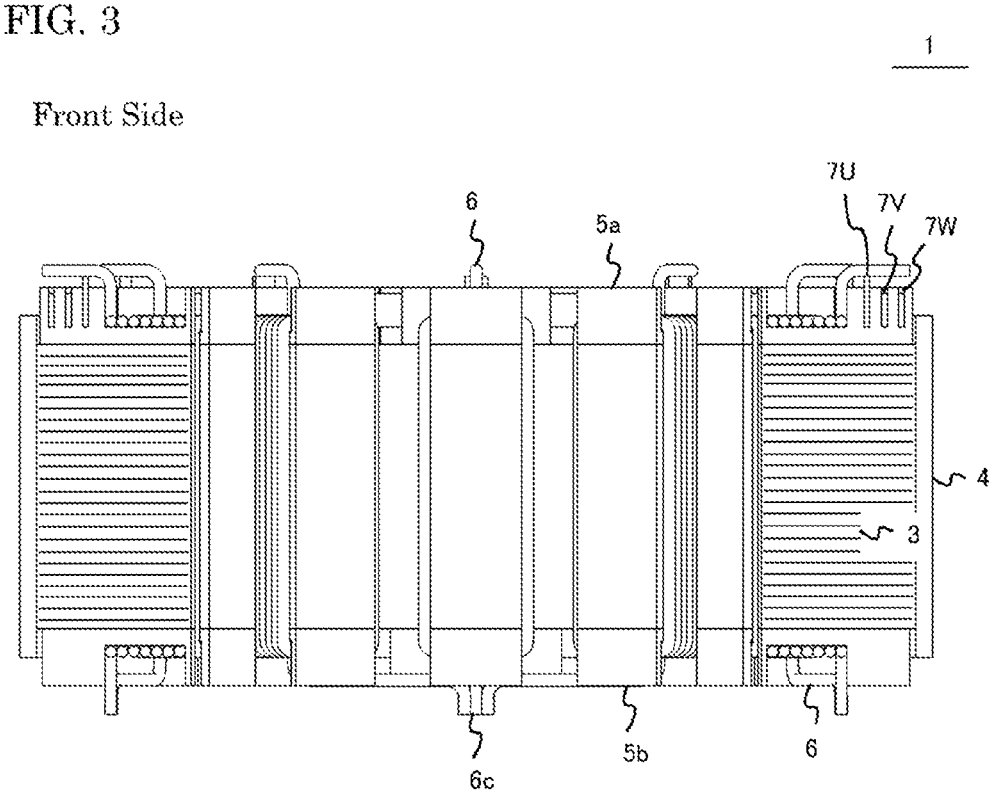
FIG. 3 is a cross sectional view for showing the stator according to Embodiment 1 of the present application.

FIG. 3 shows a cross sectional drawing of the stator 1. A stator iron core 3 is formed by layer-stacking a plurality of magnetic steel sheets. The stator iron cores 3, which are arranged in a circle so that the outer periphery sides thereof may be inter linked together, are contained in inside of the yoke 4. Two insulated bobbins 5 (a front side insulated bobbin 5a and a rear side insulated bobbin 5b), which are formed by resin molded articles, are provided in each of the stator iron cores 3, so that the insulated bobbins may pinch an uppermost layer and a lowermost layer of the magnetic steel sheets. A coil 6 is formed of electric wire which is wound around the two insulated bobbins 5 (a front side insulated bobbin 5a and a rear side insulated bobbin 5b) to make a plurality of layers of the electric wire, where the insulated bobbins are attached to a stator iron core 3 (a sub stator core 8).

The bus ring 7U, the bus ring 7V, and the bus ring 7W correspond to U phase, V phase, and W phase in three phase alternating electric current, respectively. The bus ring 7U, the bus ring 7V, and the bus ring 7W, all of which are attached to the front side insulated bobbin 5a, are electrically connected with coils 6, each of which is wound around a stator iron core 3. Three neighboring stator iron cores 3 (and coils 6) are considered to make one group in the configuration. One coil common 6c is formed from one coil group, which is composed of three coils 6. Electric power, which is inputted into each of the bus rings 7U, 7V, and 7W, will be distributed to each of the coils 6. The coil common 6c is formed on a rear side insulated bobbin side. The bus rings 7U, 7V, and 7W are attached on a front side insulated bobbin side.

Figure 4:
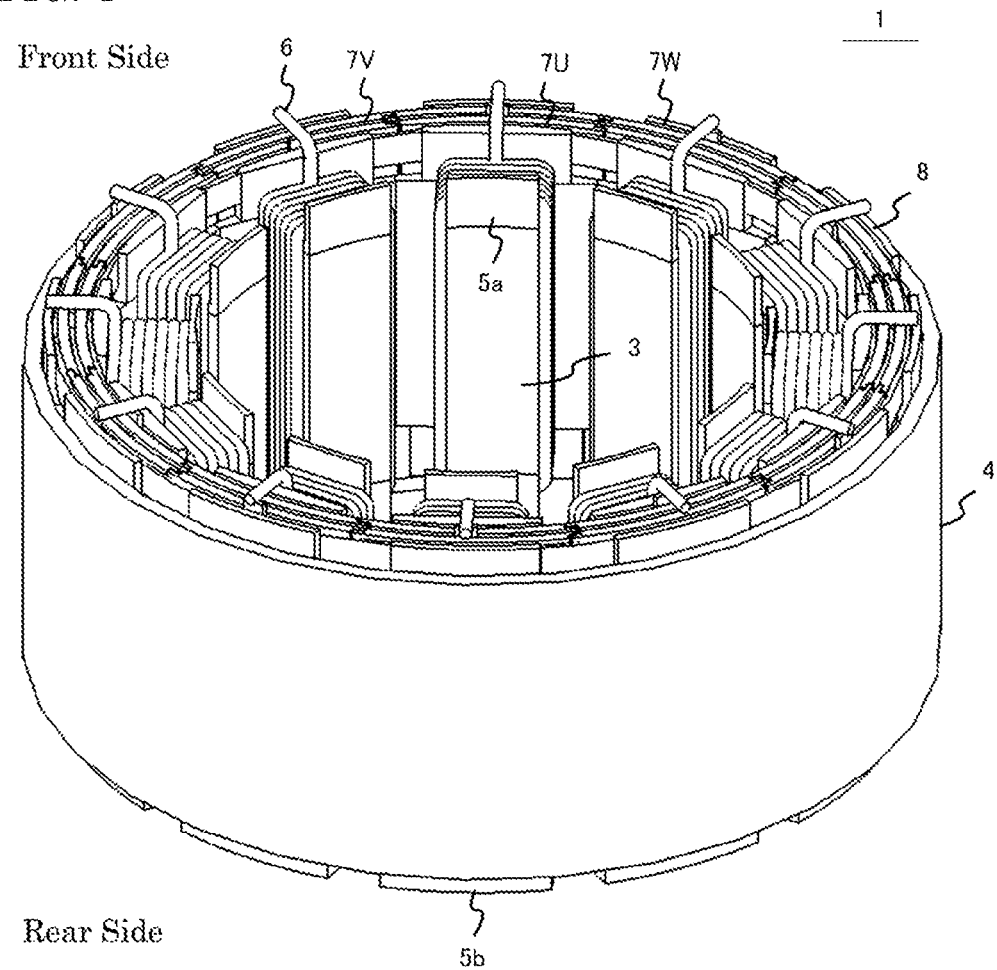
FIG. 4 is a front side perspective view for showing the stator according to Embodiment 1 of the present application.

FIG. 4 is a perspective view which shows a stator 1 of the rotating electric machine 100 in accordance with Embodiment 1 of the present application. The stator 1 is provided with sub stator cores 8, a yoke 4, and bus rings 7. A sub stator core 8 is composed of a stator iron core 3, two insulated bobbins 5 (a front side insulated bobbin 5a and a rear side insulated bobbin 5b), and a coil 6. The sub stator cores 8, which are inter linked at the outer periphery sides, are arranged in a circle. In the drawing, the number of sub stator cores 8 is 12 in all. Three bus rings 7 (a bus ring 7U, a bus ring 7V, and a bus ring 7W), which correspond to U phase, V phase, and W phase, are attached to the front side insulated bobbins 5a (first insulated bobbins).

Figure 5:
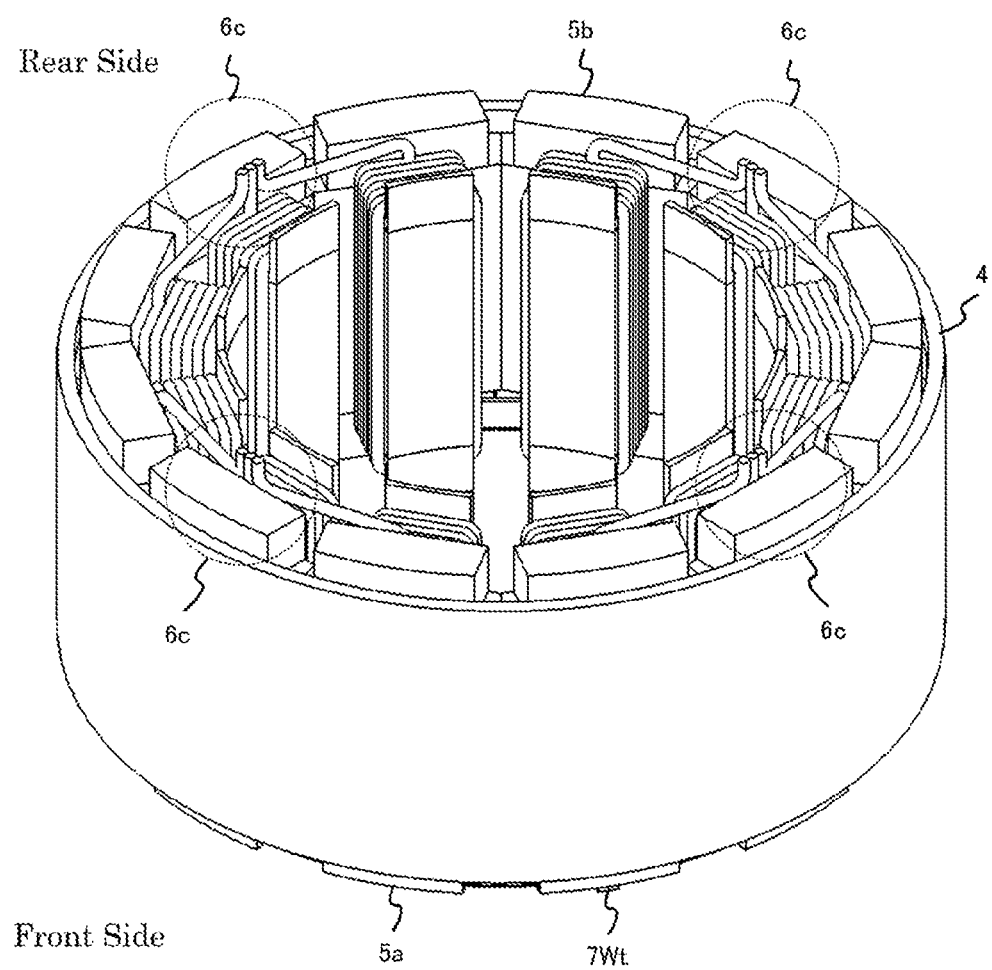
FIG. 5 is a rear side perspective view for showing the stator according to Embodiment 1 of the present application.

FIG. 5 shows a perspective illustration of the stator 1, which is viewed from the rear side thereof. The number of sub stator cores 8 (stator iron cores 3) is 12 in all. One coil common 6c in the coil 6 is formed, with respect to three neighboring stator iron cores 3. Coils of three neighboring stator iron cores 3, which are connected electrically to make one coil group, offer the star connection to each of the coils 6. In the drawing, coil commons 6c in the coil are formed at four points.

Figure 6:
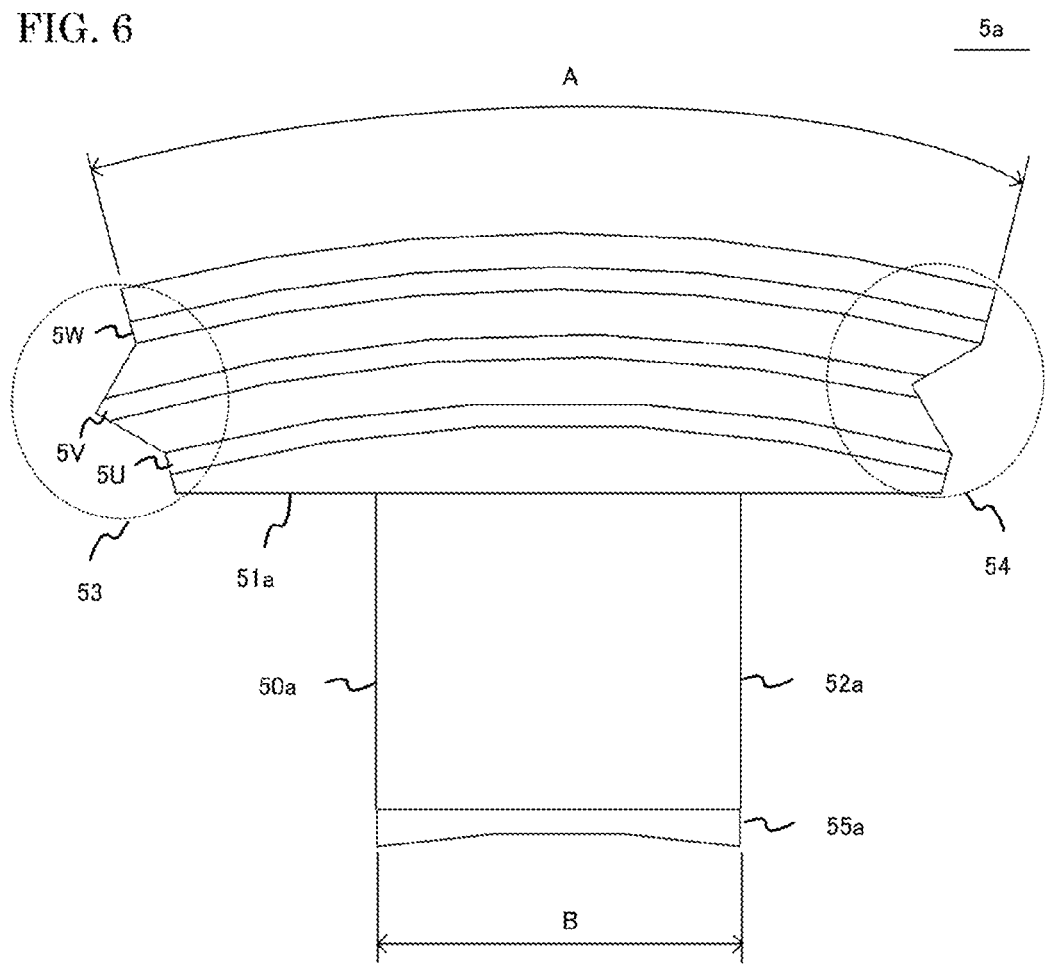
FIG. 6 is a front view for showing a first insulated bobbin according to Embodiment 1 of the present application.

FIG. 6 shows a configuration of a front side insulated bobbin 5a (a first insulated bobbin) according to Embodiment 1. The front side insulated bobbin 5a is composed of a teeth part 50a and a core back part (a circular ring part) 51a. The teeth part 50a has a winding wire part 52a and a coil holding part 55a. Ring holding parts 5U, 5V, and 5W of groove like shape, which extend in a circumferential direction, are formed in the core back part 51a. The core back part 51a is provided with a convex part 53 and a concave part 54, each at an end part of the side faces thereof. An electric wire will be wound around the winding wire part 52a. A bus ring 7U, a bus ring 7V, and a bus ring 7W are, each and all, of ring shape. The bus ring 7U will be attached to the ring holding part 5U. The bus ring 7V will be attached to the ring holding part 5V. The bus ring 7W will be attached to the ring holding part 5W.

The ring holding parts 5U, 5V, and 5W are capable of insulating the bus rings 7U, 7V, and 7W, and besides, can hold and support the bus rings. The convex part 53 which has triangular shape and the concave part 54 which has triangular shape are provided on one side and the other side of the ring holding part 5V, which can hold and support the center bus ring 7V. Because the convex part 53 which has triangular shape and the concave part 54 which has triangular shape are parts which will be fitted in together at a latter process, the front side insulated bobbin is configured to have a convex part 53 of triangular shape which is smaller than a concave part 54 of triangular shape. It is to be noted that the convex part 53 and the concave part 54 can accept a mirror reversed arrangement of the current one. The teeth part 50a (a winding wire part 52a and a coil holding part 55a) is assumed to have a width B. The core back part 51a (a circular ring part, a ring holding part) is assumed to have a length A of the circumferential direction.

Figure 7:
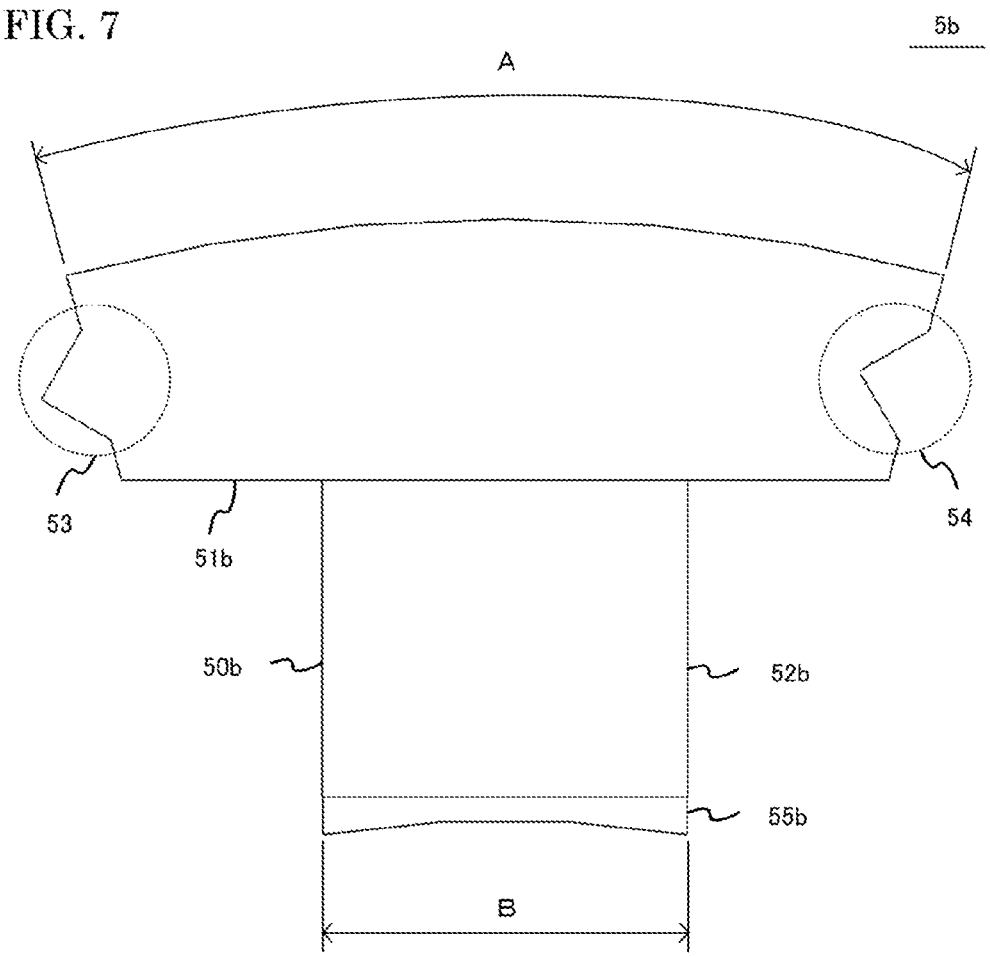
FIG. 7 is a front view for showing a second insulated bobbin according to Embodiment 1 of the present application.

FIG. 7 shows a configuration of a rear side insulated bobbin 5b (a second insulated bobbin) according to Embodiment 1. The rear side insulated bobbin 5b is composed of a teeth part 50b and a core back part (a circular ring part) 51b. The teeth part 50b has a winding wire part 52b and a coil holding part 55b. The core back part 51b is provided with a convex part 53 which has triangular shape and the concave part 54 which has triangular shape, each at an end part of the side faces thereof. Electric wire will be wound around the winding wire part 52b. Because the convex part 53 which has triangular shape and the concave part 54 which has triangular shape are parts which will be fitted in together at a latter process, the rear side insulated bobbin is configured to have a convex part 53 of triangular shape which is smaller than a concave part 54 of triangular shape. It is to be noted that the convex part 53 which has triangular shape and the concave part 54 which has triangular shape can accept a mirror reversed arrangement of the current one. The teeth part 50b (a winding wire part 52b and a coil holding part 55b) is assumed to have a width B. The core back part 51b is assumed to have a length A of the circumferential direction.

Figure 8:
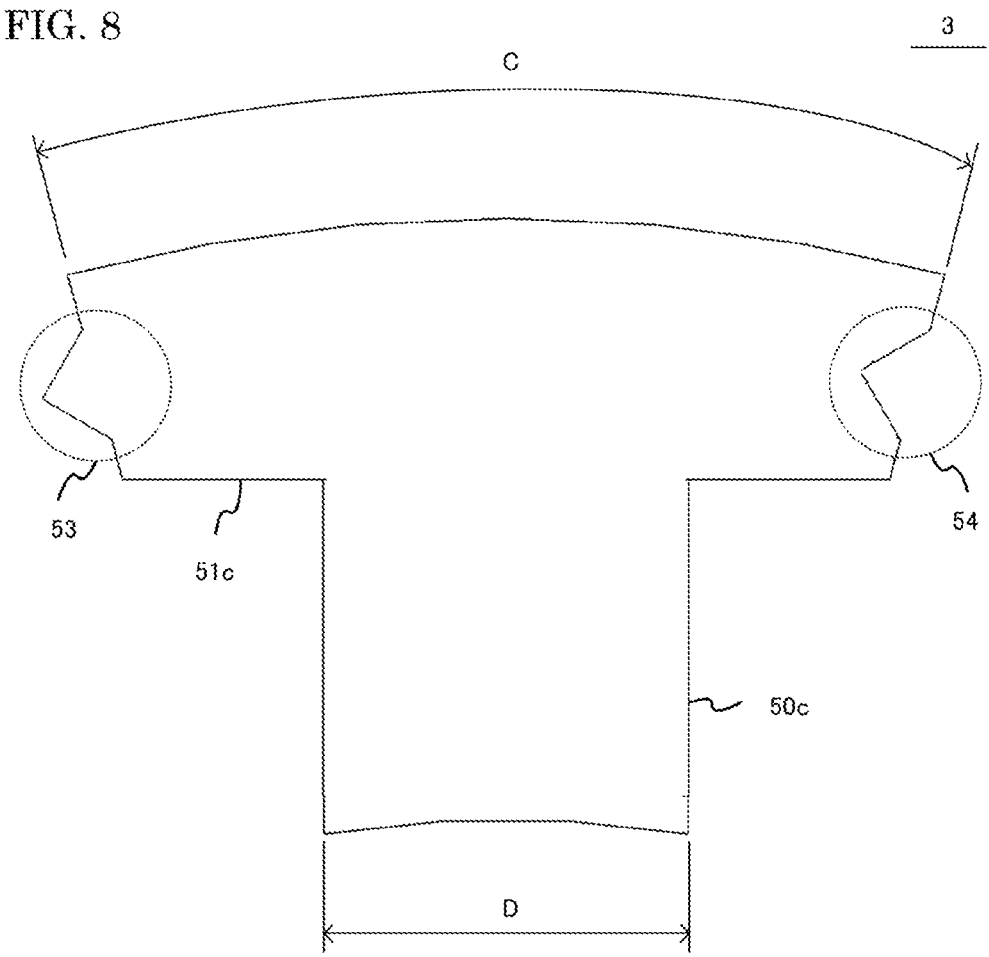
FIG. 8 is a front view for showing a stator iron core according to Embodiment 1 of the present application.

FIG. 8 shows a configuration of a stator iron core 3 according to Embodiment 1. The stator iron core 3 is formed by layer-stacking a plurality of magnetic steel sheets. The stator iron core 3 is composed of a teeth part 50c and a core back part (a circular ring part) 51c. The core back part 51c is provided with a convex part 53 which has triangular shape and a concave part 54 which has triangular shape, each at an end part of the side faces thereof. An electric wire is wound around the teeth part 50c. Because the convex part 53 which has triangular shape and the concave part 54 which has triangular shape are parts which will be fitted in together at a latter process, the stator iron core 3 is configured to have a convex part 53 of triangular shape which is smaller than a concave part 54 of triangular shape.

It is to be noted that the convex part 53 which has triangular shape and the concave part 54 which has triangular shape can accept a mirror reversed arrangement of the current one. The teeth part 50c is assumed to have a width D.

The core back part 51c is assumed to have a length C. The width D of the teeth part 50c is made one size smaller than the width B of the teeth part 50a (and the width B of the teeth part 50b), in order to avoid the contact with a coil 6. The length C of the core back part 51c is made one size larger than the width A of the core back part 51a (and the width A of the core back part 51b), in order to avoid the contact with neighboring insulated bobbins 5.

Figure 9A:
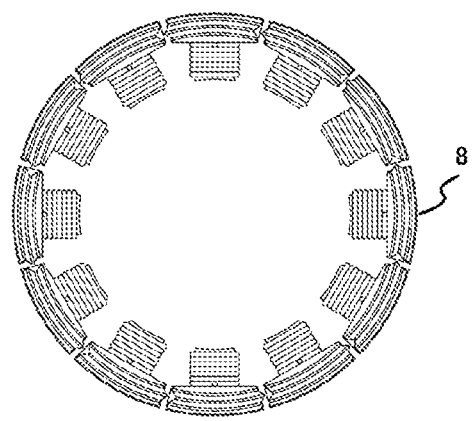
FIG. 9A is a plain view for showing a first assembling process of sub stator cores according to Embodiment 1 of the present application.
Figure 9B:
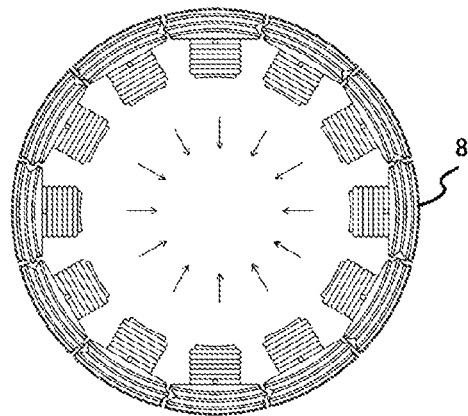
FIG. 9B is a plain view for showing a second assembling process of sub stator cores according to Embodiment 1 of the present application.
Figure 9C:
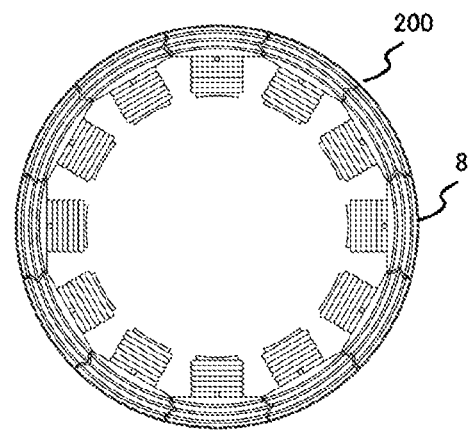
FIG. 9C is a plain view for showing a third assembling process of sub stator cores according to Embodiment 1 of the present application.

FIG. 9A to FIG. 9C are plan views which show the assembling processes of sub stator cores in accordance with the embodiments of the present application. In FIG. 9A to FIG. 9C, twelve of sub stator cores 8 are arranged in a circular ring. A sub stator core 8 is composed of a stator iron core 3, insulated bobbins 5 (a front side insulated bobbin 5a and a rear side insulated bobbin 5b), and a coil 6. In FIG. 9A, the sub stator cores 8, which are arranged in a circular ring, are placed in a position where a convex part 53 of one insulated bobbin 5 does not contact with a concave part 54 of its adjoining insulated bobbin 5.

FIG. 9B shows a state, in which each of the sub stator cores 8 is moved towards inside of the diameter direction at the same time. The convex part 53 and the concave part 54 of the insulated bobbin 5 are successfully located at a closer position each other, without interference with each other. FIG. 9C shows a state, in which each of the sub stator cores 8 is moved towards further inside of the diameter direction. The stator iron cores 3 of two adjoining sub stator cores 8 are in contact with each other. In this case, a convex part 53 and a concave part 54 of two adjoining insulated bobbins 5 will be fitted in together. The sub stator cores are configured to have a clearance gap 200 which is provided between the convex part 53 and the concave part 54 of two insulated bobbins 5, from the processing accuracy and the assembling accuracy of stator iron cores 3, insulated bobbins 5, and the like.

Figure 10:
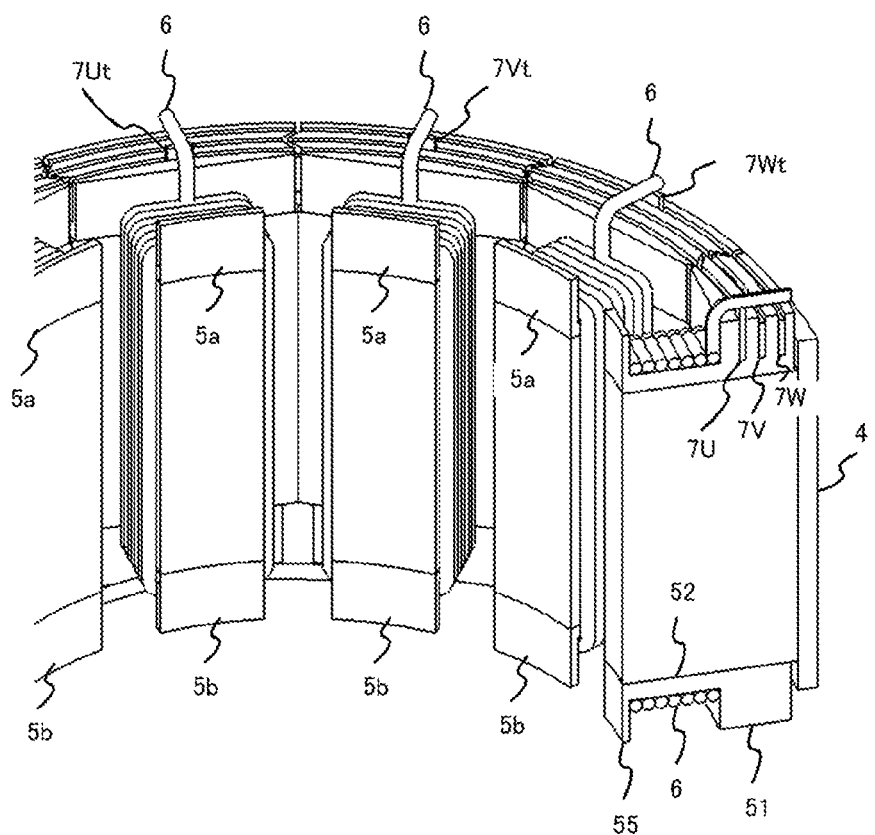
FIG. 10 is a cross sectional perspective view for showing the stator according to Embodiment 1 of the present application.

FIG. 10 shows a cross sectional drawing of the stator 1. Bent end points of coils 6 are shown in the drawing, whereby the end point of a coil in a sub stator core 8, which had stood straight, was bent, after each of the bus rings 7U, 7V, and 7W were inserted into the front side insulated bobbins 5a. In order to join each of the bus rings 7U, 7V, and 7W with coils 6, the bus ring 7U, the bus ring 7V, and the bus ring 7W are respectively provided with a fixing part 7Ut, a fixing part 7Vt, and a fixing part 7Wt, each of which is a portion of convex shape in their own bus ring. Each of the coils 6 is formed to have a bent end point, so that the bent end point of a coil 6 may come to one of the upper end faces of the fixing parts 7Ut, 7Vt, and 7Wt. Following the coil bending, each of the bus rings 7U, 7V, and 7W will be electrically joined with coils 6.

Figure 11:
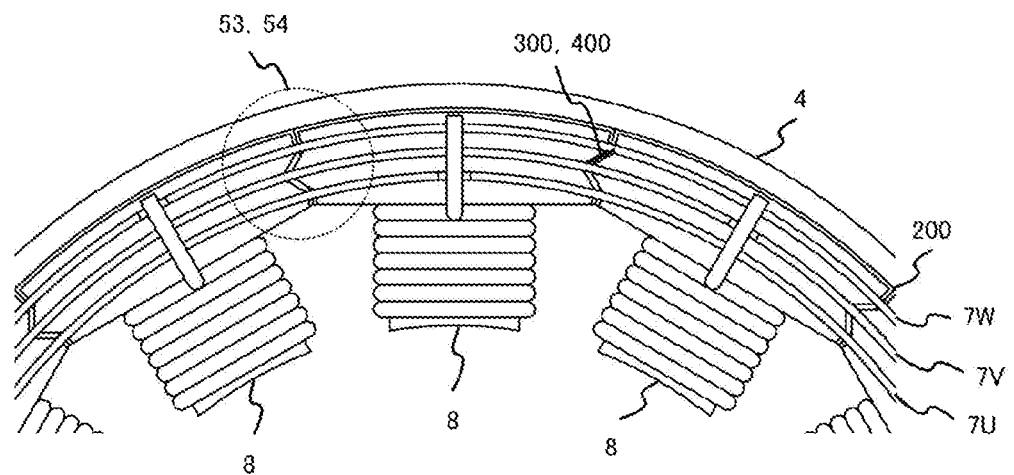
FIG. 11 is a first enlarged view for showing the stator according to Embodiment 1 of the present application.

An enlarged drawing of a front view of the stator 1 in accordance with Embodiment 1 is shown in FIG. 11. A convex part 53 which has triangular shape and a concave part 54 which has triangular shape, each of which is formed in one of two adjoining insulated bobbins 5, are fitted in together, with providing a clearance gap 200 in between. The insulated bobbin 5 has a convex part 53 and a concave part 54 which intervene between the bus ring 7U and the bus ring 7V and between the bus ring 7V and the bus ring 7W. By these configurations, the electric insulation between the bus ring 7U and the bus ring 7V and between the bus ring 7V and the bus ring 7W can be secured by a spatial distance 300 or a creeping distance 400, compared with the case where there is no convex part 53 of triangle shape and no concave part 54 of triangle shape in the insulated bobbin 5.

Since addition of a new insulated component is not required between two adjoining insulated bobbins 5, the material cost is held down. Since man hours of complicated part assembly can be reduced, the manufacturing cost is also held down. In the case where there is not a convex part 53 which has triangular shape and not a concave part 54 which has triangular shape in the insulated bobbin 5, it is necessary to widen the rotating electric machine 100 towards the outer diameter side and to increase a space between the bus ring 7U and the bus ring 7V and a space between the bus ring 7V and the bus ring 7W, in order to secure the insulation between the bus ring 7U and the bus ring 7V and between the bus ring 7V and the bus ring 7W, by the same spatial distance. According to the present embodiment, it is possible to downsize the rotating electric machine 100, because the electric insulation among the bus rings is secured.

Figure 12:
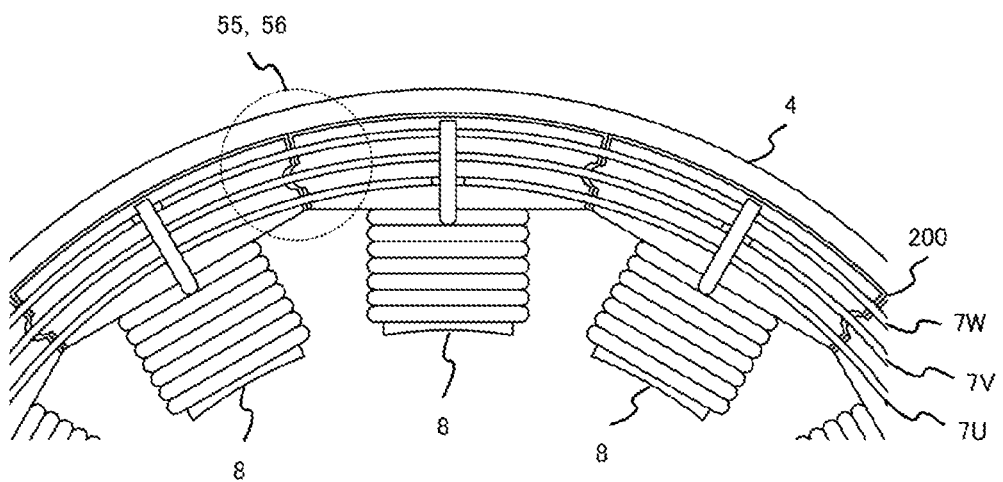
FIG. 12 is a second enlarged view for showing the stator according to Embodiment 1 of the present application.

Furthermore, the sub stator cores 8 can be aligned also from the diameter direction, not only from the axial direction, even if an insulated bobbin 5 protrudes out from a stator iron core 3 towards the circumferential direction. Compared with the case where the insulated bobbin does not protrude out to the circumferential direction, the part assembling is scarcely affected by the present configurations and the cost of equipment does not go up. Further, since the spatial distance 300 or the creeping distance 400 for the insulation are secured to a sufficient degree, a rotating electric machine 100 with higher voltage output can be manufactured in the same size, in the case where larger distances between the bus ring 7U and the bus ring 7V and between the bus ring 7V and the bus ring 7W are not employed to the diameter direction. It is to be noted that the same effect can be obtained, even in the case where the convex part 53 which has triangular shape and the concave part 54 which has triangular shape are replaced with the convex part 55 which has circular arc shape and the concave part 56 which has circular arc shape, as shown in FIG. 12.

When segment cores, which are each provided with resin made insulated bobbins, are arranged in a circular ring, two adjoining insulated bobbins overlap with each other in the diameter direction. Spaces are filled up with resins, which intervene between V phase, U phase, and W phase. The insulation among the bus rings can be secured without adding a new insulated component, and the number of parts and man hours of part assembly can be reduced. Further, since the divided cores can be arranged in a circular ring even from the diameter direction, the constitution of equipment does not become complicated. Furthermore, it is possible to provide a rotating electric machine, the segment cores of which can be arranged in a circular ring, even from a diameter direction and even also from an axial direction.

Embodiment 2

Figure 13:
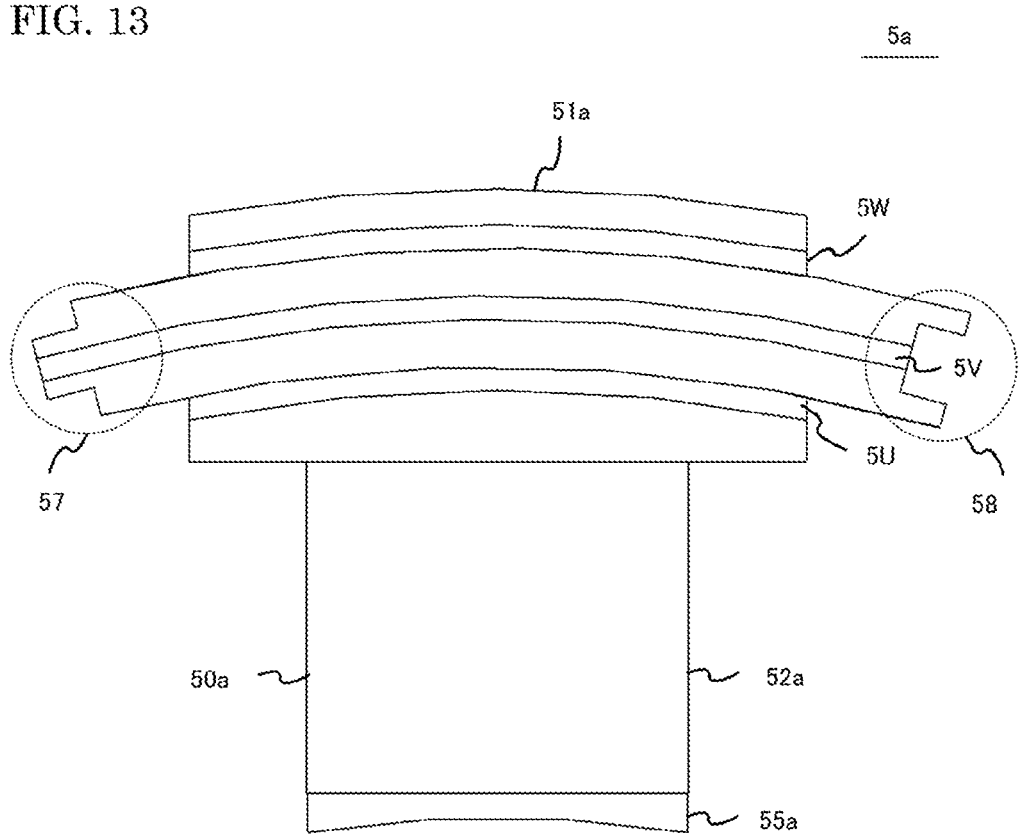
FIG. 13 is a top view for showing a first insulated bobbin according to Embodiment 2 of the present application.

Embodiment 2 of the present application will be explained with reference to FIG. 13. It is to be noted that Embodiment 2 is similar in construction to Embodiment 1, except that the convex part 53 which has triangular shape and the concave part 54 which has triangular shape, which are formed in both of the insulated bobbins 5 (a front side insulated bobbin 5*a* and a rear side insulated bobbin 5*b*), are replaced with a convex part 57 which has rectangular shape and a concave part 58 which has rectangular shape. Therefore, the same reference numerals are given to the identical parts in Embodiment 1, and explanation will be so made. The front side insulated bobbin 5*a* of the rotating electric machine 100 in accordance with Embodiment 2 is provided with a convex part 57 which has rectangular shape and a concave part 58 which has rectangular shape, on one side and the other side of the ring holding part 5V that can hold and support the center bus ring 7V.

Figure 14:
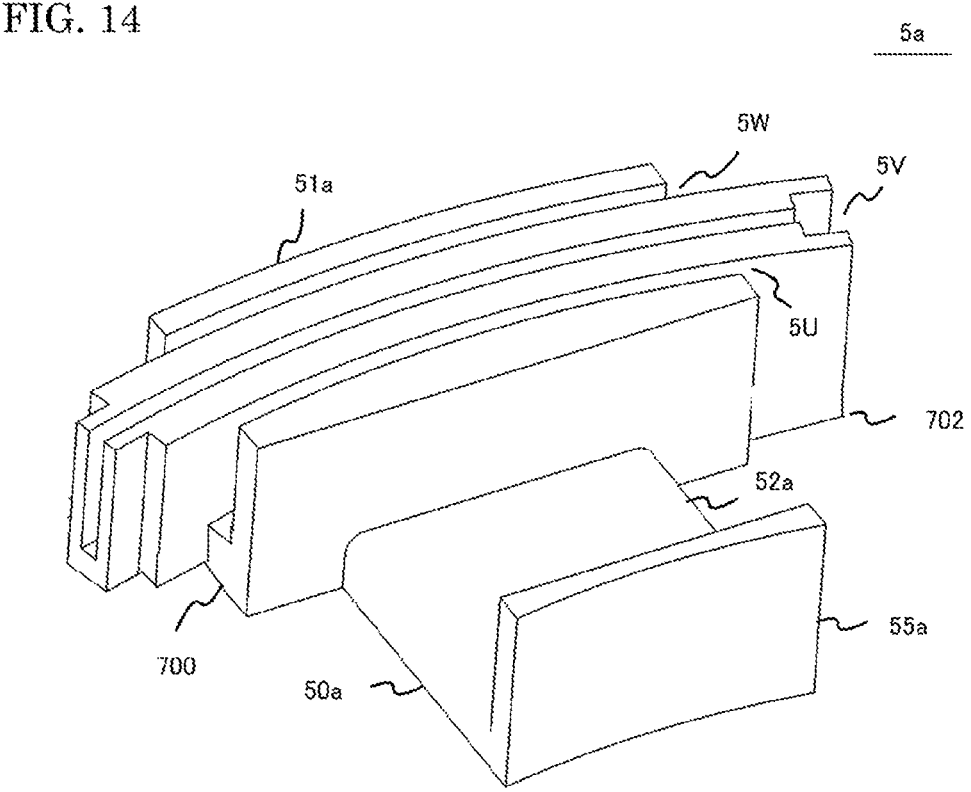
FIG. 14 is a perspective view for showing the first insulated bobbin according to Embodiment 2 of the present application.

FIG. 14 is a perspective view which shows a first insulated bobbin according to Embodiment 2 of the present application. Ring holding parts 5U, 5V, and 5W are formed on the upper side of a base part 700. The convex part 57 which has rectangular shape and the concave part 58 which has rectangular shape exist in a range, which is outside of the ring holding part 5U and is inside of the ring holding part 5W, where the ring holding part 5U can hold and support the bus ring 7U of the inner periphery side and the ring holding part 5W can hold and support the bus ring 7W of the outer periphery side. The convex part 57 which has rectangular shape and the concave part 58 which has rectangular shape are parts which will be fitted in together at a post process. The first insulated bobbin is configured to have a convex part 57 of rectangular shape which is smaller than a concave part 58 of rectangular shape. It is to be noted that the convex part 57 which has rectangular shape and the concave part 58 which has rectangular shape can accept a mirror reversed arrangement of the current one.

Figure 15:
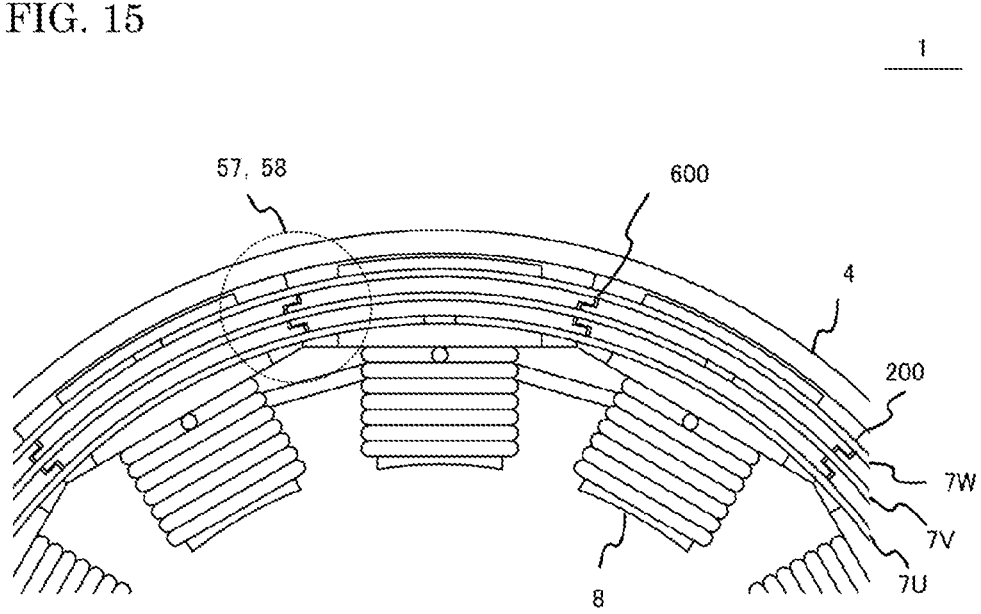
FIG. 15 is a partial enlarged view for showing a stator according to Embodiment 2 of the present application.

FIG. 15 is a partial enlarged view of the stator according to the present embodiment. The front side insulated bobbin 5*a* is provided with a convex part 57 which has rectangular shape and a concave part 58 which has rectangular shape. Sub stator cores 8, each of which is wound around by a conducting wire, are aligned in a circular ring, and a yoke 4 is inserted into the stator 1. The front side insulated bobbin 5*a* has a ring holding part 5U, a ring holding part 5V, and a ring holding part 5W, each of which is attached with a bus ring 7U, a bus ring 7V, and a bus ring 7W, respectively. The sub stator cores 8 are configured to have a clearance gap 200, which is provided between a convex part 57 which has rectangular shape and a concave part 58 which has rectangular shape, each of which is formed in one of two adjoining insulated bobbins 5, from the processing accuracy and the assembling accuracy in the stator iron core 3, the insulated bobbin 5, and the like. Because a convex part 57 which has rectangular shape and a concave part 58 which has rectangular shape, each of which is provided in one of two adjoining insulated bobbins 5, are fitted in together, with providing a clearance gap 200 in between, it is possible for the insulated bobbin 5 to intervene the convex part 57 of rectangular shape and the concave part 58 of rectangular shape between the bus ring 7U and the bus ring 7V and between the bus ring 7V and the bus ring 7W.

According to the configurations mentioned above, the electric insulation between the bus ring 7U and the bus ring 7V and between the bus ring 7V and the bus ring 7W can be secured by the creeping distance 600, compared with the case where there is no convex part 57 which has rectangular shape and no concave part 58 which has rectangular shape in the first insulated bobbin. Accordingly, the material cost can be held down, since it is not necessary to add a new insulated component between the adjoining insulated bobbins 5. Since man hours of complicated part assembly can be reduced, the manufacturing cost can be held down.

Further, when the convex part 57 which has rectangular shape and the concave part 58 which has rectangular shape are adopted, it will become possible to secure a longer creeping distance, compared with the spatial distance, or the creeping distance of straight line or of circular arc. The distance between the bus ring 7U and the bus ring 7V and the distance between the bus ring 7V and the bus ring 7W can be made smaller to a diameter direction, and the rotating electric machine 100 can be down sized. Further, when larger distances between the bus ring 7U and the bus ring 7V and between the bus ring 7V and the bus ring 7W are not employed to the diameter direction, a rotating electric machine 100 with higher voltage output can be manufactured in the same size, because an enough creeping distance of insulation is secured.

Further, even if an insulated bobbin 5 sticks out from the stator iron cores 3 to the circumferential direction, a sub stator core 8 can be aligned from the diameter direction, in addition to from the axial direction. Compared with the case where the insulated bobbin does not stick out to the circumferential direction, the part assembling is scarcely affected by the present configurations and the cost of equipment does not go up. It is obvious that the present embodiment contains also chamfering and R processing which will be performed to portions of the rectangular convex part 57 and the rectangular concave part 58, in order to increase the performance in part assembling.

Embodiment 3

Figure 16:
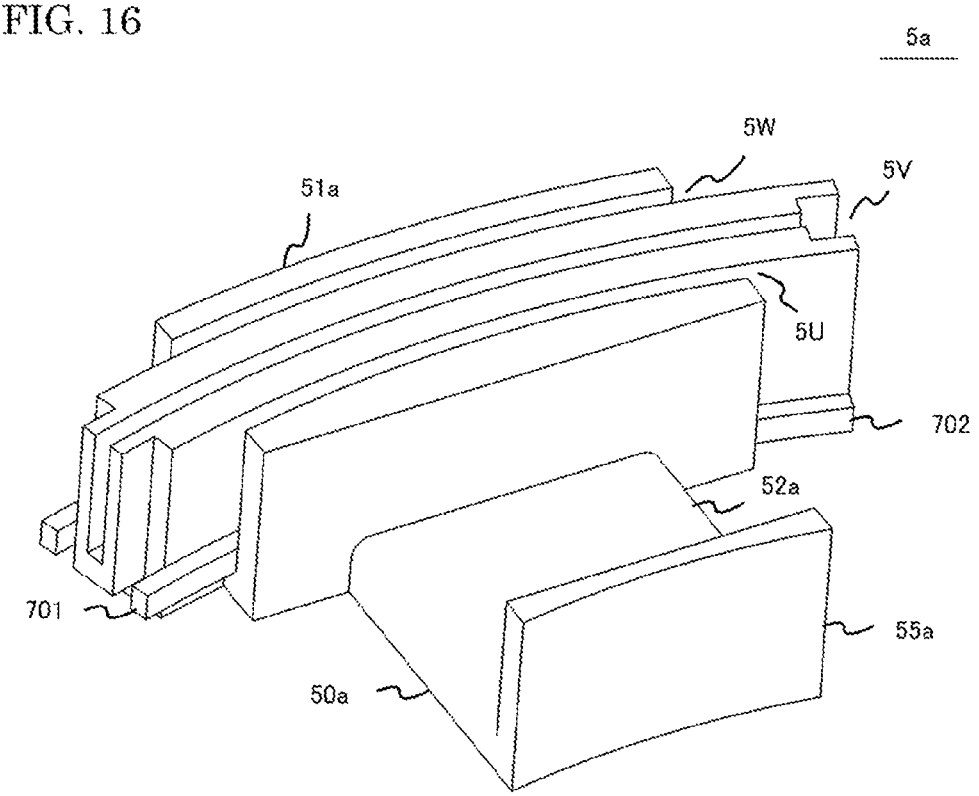
FIG. 16 is a top view for showing a first insulated bobbin according to Embodiment 3 of the present application.

A front side insulated bobbin 5*a* in accordance with Embodiment 3 of the present application is shown in FIG. 16. It is to be noted that, in Embodiment 3, the base part 700 of the ring holding parts 5U, 5V, and 5W is extended to one side and the other side, with respect to Embodiments 1 and 2. The front side insulated bobbin 5*a* has a ring holding part 5U, a ring holding part 5V, and a ring holding part 5W, which can hold and support the bus ring 7U, the bus ring 7V, and the bus ring 7W. A left hand side base part 701 and a right hand side base part 702 have different heights from the base face. Similar configurations are adopted in other parts.

Figure 17:
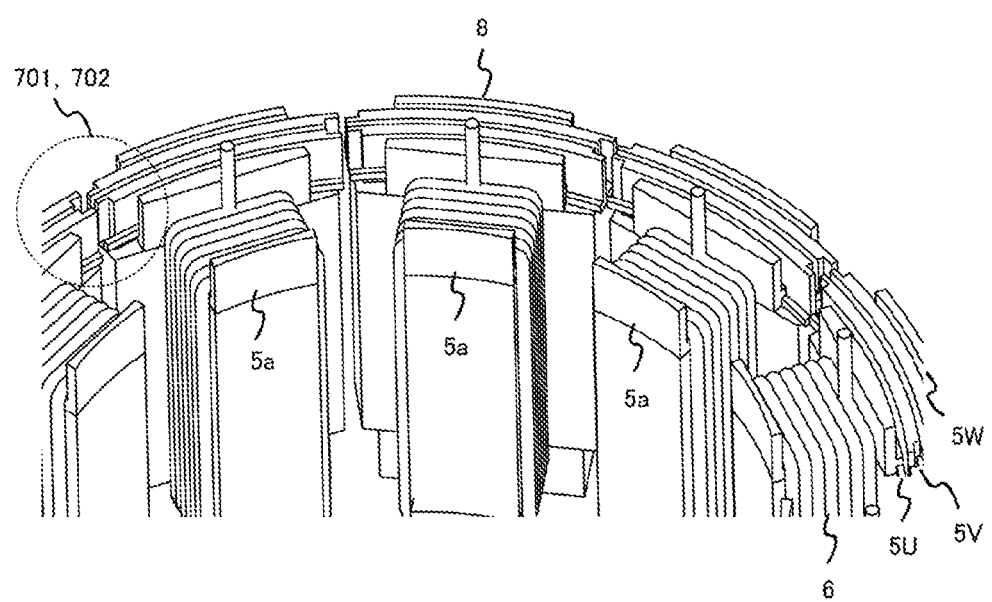
FIG. 17 is a perspective view for showing a sub stator core according to Embodiment 3 of the present application.
Figure 18:
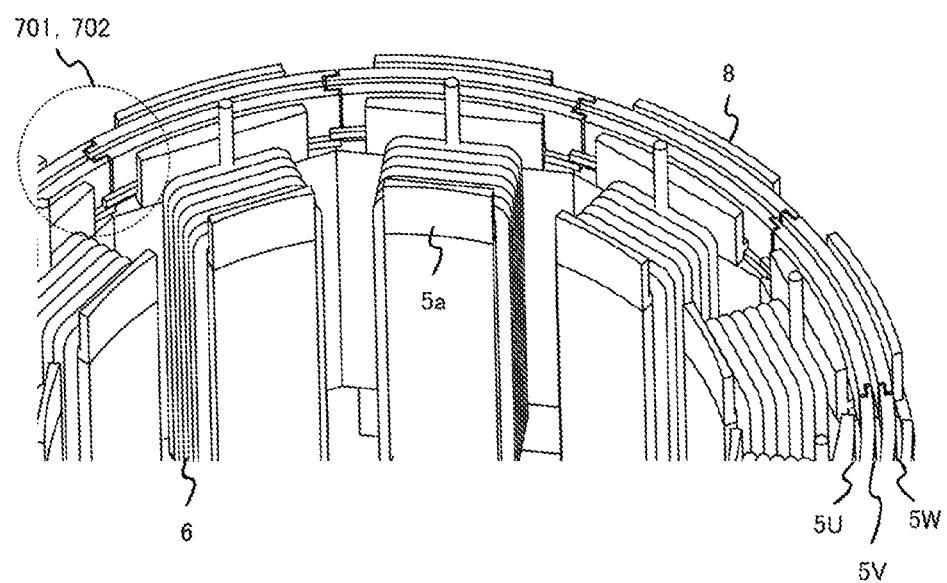
FIG. 18 is a perspective view for showing a stator according to Embodiment 3 of the present application.

In FIG. 17, sub stator cores 8 of the rotating electric machine 100 in accordance with the present embodiment are arranged in a circular ring, where two adjoining insulated bobbins 5 are located in a position to avoid interference with each other. FIG. 18 shows a configuration of sub stator cores 8, where each of the sub stator cores 8 is moved closer to a center point of the diameter direction at the same time, from the former state. Because the ring holding part 5U has different heights at the left hand side base part 701 and the right hand side base part 702, sub stator cores can overlap to an axial direction without interfering with each other, when each of the sub stator cores is moved to the center point. The ring holding parts 5U, 5V, and 5W of the front side insulated bobbin 5*a* hold respective bus rings.

Figure 19:
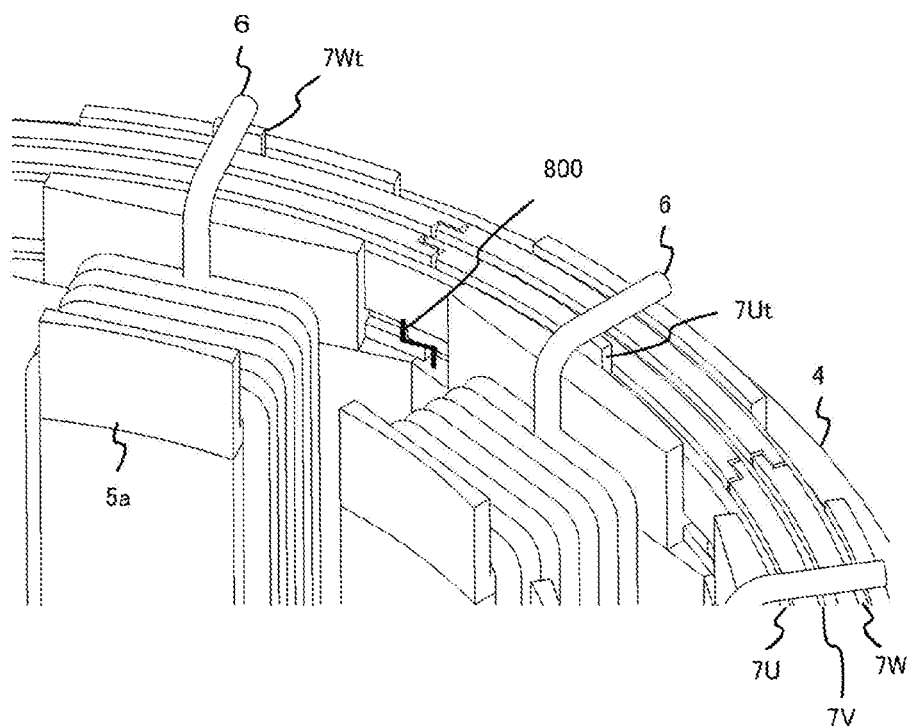
FIG. 19 is an enlarged view for showing the fixing parts of bus rings according to Embodiment 3 of the present application.

FIG. 19 is a partial enlarged view of the stator according to the present embodiment. A yoke 4 is engaged with aligned sub stator cores 8. Each of the bus rings 7U, 7V, and 7W is attached to the front side insulated bobbin 5*a*. Coils 6 are formed to have a bent end point, which can overlap with respective bus rings, at positions of the fixing parts 7Ut, 7Vt, and 7Wt. The left hand side base part 701 and the right hand side base part 702 of a front side insulated bobbin 5*a* intervene between the stator iron core 3 and each of the bus rings 7U, 7V, and 7W. Thereby, insulation between the stator iron core 3 and each of the bus rings 7U, 7V, and 7W can be secured not by a spatial distance but by a creeping distance 800. The material cost can be held down, since it is not necessary to add a new insulated component between the stator iron core 3 and each of the bus rings 7U, 7V, and 7W. Since man hours of complicated part assembly can be reduced, the manufacturing cost can be held down.

Further, in order to secure the insulation between the stator iron core 3 and each of the bus rings 7U, 7V, and 7W by the spatial distance, it is necessary to widen the rotating electric machine 100 to an axial direction and employ larger distances between the stator iron core 3 and each of the bus rings 7U, 7V, and 7W. Since the insulation is secured by the creeping distance, downsizing in the rotating electric machine 100 is accomplished. Further, even if an insulated bobbin 5 sticks out from the stator iron cores 3 to the circumferential direction, a sub stator core 8 can be aligned from the diameter direction, in addition to from the axial direction. The part assembling is scarcely affected by the configurations and the cost of equipment does not go up. When larger distances of the bus rings 7U, 7V and 7W are not employed to the axial direction, a rotating electric machine 100 with higher voltage output can be manufactured in the same size, because an enough creeping distance of insulation is secured.

Embodiment 4

Figure 20:
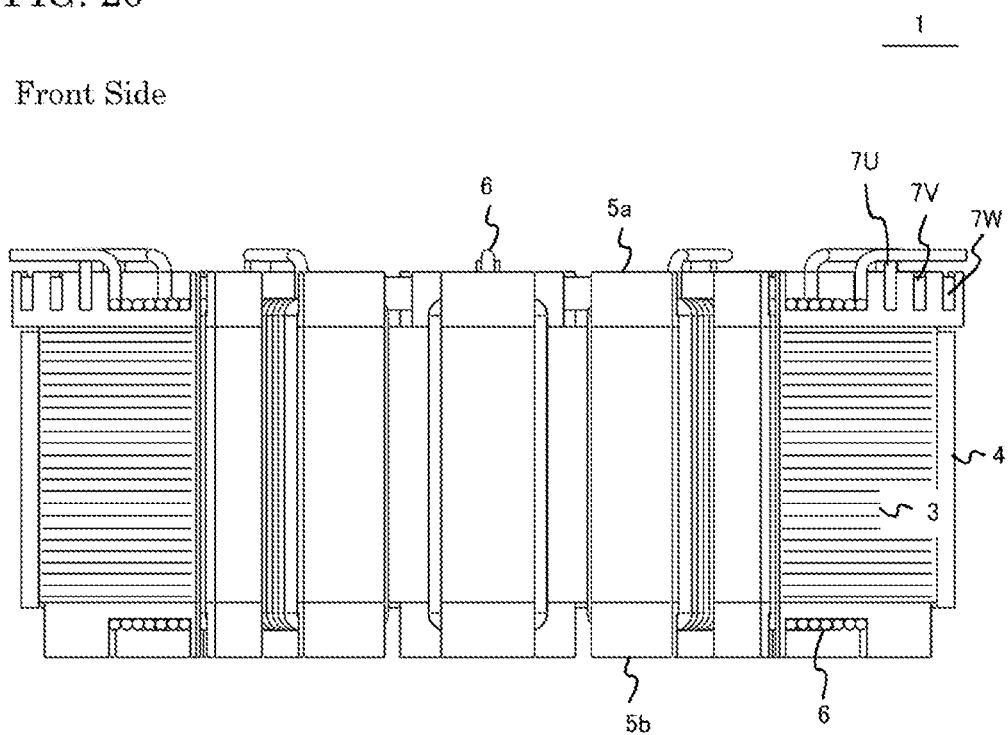
FIG. 20 is a cross sectional view for showing a stator according to Embodiment 4 of the present application.

FIG. 20 shows a cross sectional drawing of the stator 1 in accordance with Embodiment 4 of the present application. A stator iron core 3 is formed by layer-stacking a plurality of magnetic steel sheets. The stator iron cores 3, which are arranged in a circular ring so that the outer periphery sides thereof may be inter linked together, are contained in the inside of the yoke 4. Insulated bobbins 5 (a front side insulated bobbin 5a and a rear side insulated bobbin 5b), which are formed by resin molded articles, are provided in each of the stator iron cores 3, so that the bobbins may pinch an uppermost layer and a lowermost layer of the magnetic steel sheets. The coil 6 is formed of an electric wire which is wound around the insulated bobbins 5 (the front side insulated bobbin 5a and the rear side insulated bobbin 5b) to make a plurality of layers of the electric wire, where the insulated bobbins are attached to a stator iron core 3 (a sub stator core 8). Three bus rings are attached to a plurality of sub stator cores which are arranged in a circular ring.

A bus ring 7U, a bus ring 7V, and a bus ring 7W correspond to U phase, V phase, and W phase of three phase alternating electric current, respectively. The bus ring 7U, the bus ring 7V, and the bus ring 7W, which are all attached to the front side insulated bobbins 5a, are electrically connected with coils 6, which are wound around each of the stator iron cores 3. Three neighboring stator iron cores 3 (and coils 6) are considered to make one group in the configuration. One coil common 6c is formed from one coil group, which are composed of three coils 6. Electric power, which is inputted into each of the bus rings 7U, 7V, and 7W, will be distributed to each of the coils 6. The coil common 6c is formed on the rear side insulated bobbin side. The bus rings 7U, 7V, and 7W are attached on the front side insulated bobbin side.

In the stator 1 according to the present embodiment, insulated bobbins stick out from the yoke towards the outside. That is to say, the outside diameter of the front side insulated bobbin 5a is made larger than the outside diameter of the yoke 4. Because it is possible to attach a bus ring 7W (also a bus ring 7V and also a bus ring 7U) which is larger in size than the outside diameter of the yoke 4, the stator 1 will increase in intensity structurally. It is to be noted that, although the outside diameter of the rear side insulated bobbin 5b is made smaller than the outside diameter of the yoke 4 in the drawing, the outside diameter of the rear side insulated bobbin 5b may be allowed to be larger than the outside diameter of the yoke 4.

In a rotating electric machine according to the present application, an insulated bobbin of resin made is provided in each of a plurality of cores which make up a stator and segmented mutually, and coils of U phase, V phase, and W phase, are each wound around a coil winding part of the insulated bobbins, and three bus rings are each connected to one of the coils of U phase, V phase, and W phase, and three neighboring coils are connected at their coil common side of respective coils, to offer the star connection to those coils. The rotating electric machine, wherein a plate like bus ring is inserted into and held at each of the ring holding parts of groove like shape provided in each of the bobbins, and each of the bus rings has a coil connection part protruding to an axial direction, which is a portion of the cylinder part and follows a circumferential direction, and each of the coils is connected to a coil connection part in each of the bus rings, and all of the cores and insulated bobbins are arranged in a circular ring and fitted into the inner periphery of a yoke, is characterized in that a clearance gap between a bus ring and a bus ring in a diameter direction will be fulfilled, by the diameter directional overlap of two resin made insulated bobbins, which adjoin each other when the insulated bobbins are arranged in a circular ring.

Further, in the rotating electric machine according the present application, the insulated bobbin of resin made has a protruding part on the outer side of the coil winding part, and each of the ring holding parts is provided at one of three positions of the protruding part, which follow the diameter direction. Further, in the rotating electric machine according the present application, the insulations between a coil and a bus ring and between a core and a bus ring can be secured, by the diameter directional overlap of two resin made insulated bobbins, which adjoin each other when the insulated bobbins are arranged in a circular ring. Further, in a manufacturing method of a rotating electric machine according to the present application, an insulated bobbin of resin made is attached to each of all the split cores, and each of the coils of U phase, V phase, and W phase is wound around a coil winding part of the insulated bobbin of resin made, and these segment cores are aligned in a circular ring, which has a diameter large enough to avoid the contact between adjoining segment cores, and all the segment cores are moved at the same time closer to the center point and aligned, then, those cores are inserted into the inner circumference of a yoke.

Note that, in the present invention, each of the embodiments can be freely combined, appropriately modified and/or eliminated without departing from the scope of the invention.

EXPLANATION OF NUMERALS AND SYMBOLS

1 Stator; 2 Rotor; 3 Stator Iron Core; 4 Yoke; 5 Insulated Bobbin; 6 Coil; 7 Bus Ring; 8 Sub Stator Core; 10 Case; 100 Rotating Electric Machine; 200 Clearance Gap; 300 Spatial Distance; 400 Creeping Distance; 600 Creeping Distance; 701 Left Hand Side Base Part; 702 Right Hand Side Base Part

What is claimed is:

1. A rotating electric machine, comprising a rotor which has a rotating shaft, a stator which is arranged at an outer periphery side of the rotor, and a case which contains the rotor and the stator,
   wherein the stator has a plurality of sub stator cores arranged in a circular ring, a yoke disposed in the outer periphery side of the plurality of sub stator cores arranged in a circular ring, and three bus rings attached to the plurality of sub stator cores arranged in a circular ring,
   each of the sub stator cores has a first insulated bobbin, a stator iron core, a second insulated bobbin, and a coil,
   the first insulated bobbin, the stator iron core and the second insulated bobbin are each composed of a teeth part and a core back part,
   the coil is disposed in teeth parts of the first insulated bobbin, the stator iron core, and the second insulated bobbin, all of which are stacked in layers,
   the first insulated bobbin has three ring holding parts which are formed in a core back part, extend in a circumferential direction, and are provided in a radial direction with respect to each other, and the bus rings are separately inserted into the ring holding parts formed in the first insulated bobbin,
   the first insulated bobbin, the stator iron core, and the second insulated bobbin each has a convex part formed at one side face of the core back part and a concave part formed at the other side face of the core back part,
   the yoke is inserted in the plurality of sub stator cores which are arranged in the circular ring,
   wherein a spatial distance is formed between each surface of the concave part and each surface of the convex part of the first insulated bobbin.

2. The rotating electric machine as set forth in claim 1, wherein the convex parts, which are formed at side faces of the first insulated bobbin and the second insulated bobbin, have triangular shape.

3. The rotating electric machine as set forth in claim 2, wherein the coils have three neighboring coils which are connected to a common point at a second insulated bobbin side.

4. The rotating electric machine as set forth in claim 1, wherein the convex parts, which are formed at side faces of the first insulated bobbin and the second insulated bobbin, have circular arc shape.

5. The rotating electric machine as set forth in claim 4, wherein the coils have three neighboring coils which are connected to a common point at a second insulated bobbin side.

6. The rotating electric machine as set forth in claim 1, wherein the convex parts, which are formed at side faces of the first insulated bobbin and the second insulated bobbin, have rectangular shape.

7. The rotating electric machine as set forth in claim 6, wherein the coils have three neighboring coils which are connected to a common point at a second insulated bobbin side.

8. The rotating electric machine as set forth in claim 1, wherein the coils have three neighboring coils which are connected to a common point at a second insulated bobbin side.

9. The rotating electric machine as set forth in claim 1, wherein fixing parts of convex shape are formed in each of the bus rings and the coil is connected to the fixing part.

10. The rotating electric machine as set forth in claim 1, wherein the three bus rings correspond to U phase, V phase, and W phase of alternating electric current, and
   the convex part and the concave part of the first insulated bobbin intervene between the bus ring corresponding to the U phase and the bus ring corresponding to the V phase and between the bus ring corresponding to the V phase and the bus ring corresponding to the W phase.

* * * * *